United States Patent [19]
Spencer

[11] Patent Number: 5,540,417
[45] Date of Patent: Jul. 30, 1996

[54] ADJUSTABLE COIL SPRING ASSEMBLY

[76] Inventor: William W. Spencer, 705 Kennaway Court, Iverleigh Terrace, Esplanade, East London, South Africa

[21] Appl. No.: 284,079

[22] Filed: Aug. 2, 1994

[30] Foreign Application Priority Data

Aug. 2, 1993 [ZA] South Africa ............................ 93/5563
Jan. 12, 1994 [ZA] South Africa ............................ 94/0198

[51] Int. Cl.$^6$ ................................................. B60G 11/36
[52] U.S. Cl. ................................................. 267/28; 267/74
[58] Field of Search .................................. 267/28, 73, 74, 267/179, 263, 69, 71, 48, 174, 175, 177

[56] References Cited

U.S. PATENT DOCUMENTS

| | | | |
|---|---|---|---|
| 1,169,457 | 1/1916 | Brooks | 267/73 |
| 1,791,661 | 2/1931 | Cunningham | 267/28 |
| 2,264,070 | 11/1941 | Davis . | |
| 2,446,395 | 8/1948 | Wallace | 267/28 |
| 2,560,999 | 7/1951 | Unzeitig . | |
| 2,562,316 | 7/1951 | Koss | 267/28 |
| 2,607,584 | 8/1952 | Boardman et al. | 267/28 |
| 2,661,205 | 12/1953 | Corey | 267/28 |
| 2,697,600 | 12/1954 | Gregoire . | |
| 3,041,060 | 6/1962 | Jacobsen | 267/73 |
| 4,071,104 | 1/1978 | Macari et al. . | |
| 4,712,778 | 12/1987 | Newman | 267/179 |
| 4,729,290 | 3/1988 | Laatzen et al. . | |

FOREIGN PATENT DOCUMENTS

| | | | |
|---|---|---|---|
| 7590874 | 6/1976 | Australia . | |
| 666080 | 9/1929 | France | 267/28 |
| 1098875 | 4/1953 | France . | |
| 2318349 | 7/1975 | France . | |
| 0728488 | 11/1973 | South Africa . | |
| 0765846 | 9/1976 | South Africa . | |
| 0734886 | 8/1955 | United Kingdom . | |
| 0771447 | 4/1957 | United Kingdom . | |
| 0790239 | 2/1958 | United Kingdom . | |

OTHER PUBLICATIONS

Berry, Dr. W. R., Spring Design—IX, Mechanical World, Feb. 1952, vol. 131, No. 3391, pp. 85–89.

*Primary Examiner*—Lee Young
*Attorney, Agent, or Firm*—Woodard, Emhardt, Naughton, Moriarty & McNett

[57] ABSTRACT

A vehicle supplementary spring assembly is adapted to supplement the spring force provided by a leaf spring of the vehicle. The spring assembly includes an elongate coil spring which forms an axially extending passage having a wall of helical configuration defined by the inner surface of the coils of the coil spring. A first anchoring insert is configured to be in threaded engagement with the wall of the passage and is adapted to be screwed into one end of the coil spring. A first connector member is connected to the anchoring insert and is adapted to connect the supplementary spring assembly to a first reaction point on the vehicle. A second connector member is connected to the other end of the coil spring and is adapted to connect the supplementary spring assembly to a second reaction point on a vehicle. The first and second reaction points are selected in use such that a tensile force applied between the reaction points will supplement the action of the leaf spring in supporting the vehicle, said supplementary spring assembly being adapted to apply a tensile force between said first and second reaction points, said tensile force being selectively variable by varying the position of the anchoring insert along the length of the passage.

10 Claims, 4 Drawing Sheets

ADJUSTABLE COIL SPRING ASSEMBLY

BACKGROUND TO THE INVENTION

THIS invention relates to an adjustable coil spring assembly.

There exists a need for supports for the leaf springs of vehicles that are subject to high loads, such as mini-bus taxis or trucks. Mini-bus taxis, which are often loaded to capacity, benefit markedly from such leaf spring supports in that the safety and comfort of passenger is enhanced. The wear and tear on the leaf springs of the vehicle is also minimized.

Whilst it is known to provide support for leaf springs of vehicles, the installation of such supports usually requires some degree of structural modification to the vehicle. At least one support arrangement that does not require modification to the vehicle is described in South African Patent 72/8488. However, this type of support arrangement is limited in versatility as an individual support arrangement can only be installed on a limited number of vehicle types due to the great diversity in vehicle dimensions.

SUMMARY OF THE INVENTION

According to the invention there is provided a vehicle supplementary spring assembly adapted to supplement the spring force provided by a leaf spring of the vehicle, said supplementary spring assembly comprising:

- an elongate coil spring which forms an axially extending passage having a wall of helical configuration defined by the inner surface of the coils of the coil spring;
- a first anchoring insert having an outer surface with thread-like formation thereon dimensioned to be in threaded engagement with the wall of the passage and adapted to be screwed into one end of the cot spring;
- a first connector member connected to the anchoring insert and adapted to connect the supplementary spring assembly to a first reaction point on a vehicle; and
- a second connector member connected to the other end of the coil spring and adapted to connect the supplementary spring assembly to a second reaction point on a vehicle;

said first and second reaction points being selected in use such that a tensile force applied between the reaction points will supplement the action of the leaf spring in supporting the vehicle, said supplementary spring assembly being adapted to apply a tensile force between said first and second reaction points, said tensile force being selectively variable by varying the position of the anchoring insert along the length of the passage.

The first insert is preferably provided with an axial bore sized to accommodate a first connector member for connecting a first end of the spring to the first or second reaction member, the first connector member being axially movable and securable within the bore so as to allow further adjustment in overall length of the coil spring assembly.

The adjustable coil spring assembly may include a second anchoring insert formed with a thread-like formation dimensioned to allow the second insert to be screwed into the other end of the passage by engaging the helically configured wall of the passage.

To further enhance the working of the assembly, the second insert may be provided with an axial bore sized to accommodate the second connector member, the second connector member being axially movable and securable within the bore so as to allow further adjustment in the overall length of the coil spring assembly.

In a preferred embodiment of the invention, the first reaction member is constituted by an end of the leaf spring and the second reaction member is constituted by a point between opposed ends of the leaf spring.

The first connector member may include a hook for engaging an eye at an end of the leaf spring, and the second connector member may be securable to an axle of the vehicle. The second connector member may include a bracket upon which are mounted two hooks for engaging the axle of the vehicle.

At least one end of the coil spring assembly may be connected to its respective reaction member through an articulated connection. Another aspect of the invention provides for a connection bracket which is associated with the end of the coil spring which is adjacent the axle to be configured so as to align the coil spring such that its axis intersects with the axis of the axle.

The connector member associated with the axle may comprise a bracket of elongate form adapted to be aligned generally transverse to the axis of the coil spring, said bracket having a central region which in use will be generally perpendicular to the axis of the coil spring and two outer regions which are co-planar with each other and angled relative to the central region.

Preferably the coil spring is connected to the central region by a bolt which passes through a hole formed in a central region and screws into an anchoring insert located within the axially extending passage within the center of the coil spring. The bolt may be connected to the bracket in an articulated manner such that the angular relationship between the bracket and the coil spring may vary as the axle moves up and down in use.

The angle of inclination between the central region and the edge regions of the bracket may be selected such that, in the assembled condition, the coil spring assembly adopts a cranked configuration with the end of the coil spring adjacent to the axle being inclined downwardly towards the leaf spring as a consequence of the said angular relationship between the central region and the outer regions of the bracket. The bracket preferably comprises a forged plate with a concave recess formed around the hole passing through the central region, said bolt having a male cup bearing fitted thereto which locates within the concave recess and allows for said articulated connection between the bolt and the bracket. This arrangement permits the coil spring to remain straight as the leaf spring on the vehicle moves up and down.

The invention also extends to arrangements wherein the axle of the vehicle is located below the leaf spring. In this arrangement a bracket which defines a reaction member associated with the axle is clamped between the upper side of the leaf spring and U-shaped bolts or other fastening means which are used to secure the axle to the leaf spring. The bracket may be a right-angled bracket having a foot portion adapted to be clamped between the upper side of the leaf spring and the U-shaped bolts, and an upstanding arm having a hole therein through which a bolt passes, the bolt being engageable with an anchoring insert screwed into the axially extending passage in the coil spring.

DESCRIPTION OF PREFERRED EMBODIMENTS

Figure 1:
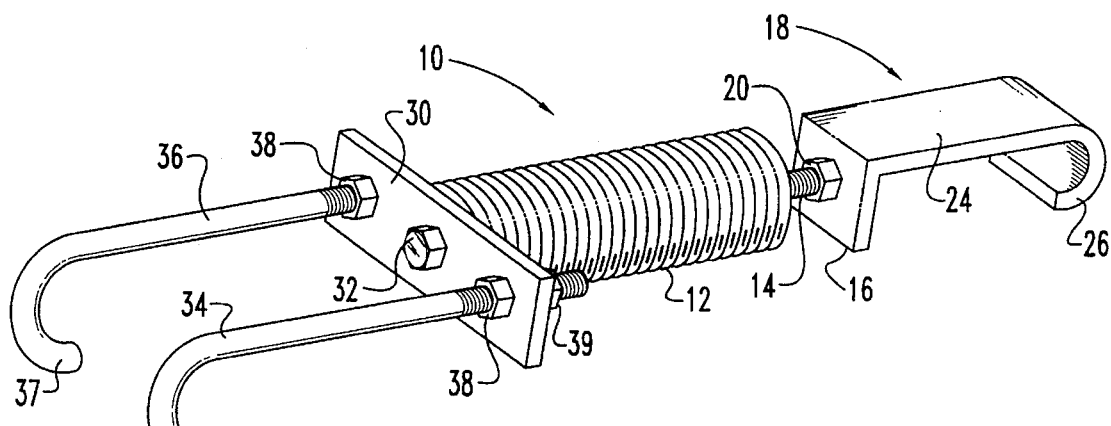
FIG. 1 shows a pictorial view of an adjustable coil spring assembly according the invention.
Figure 2:
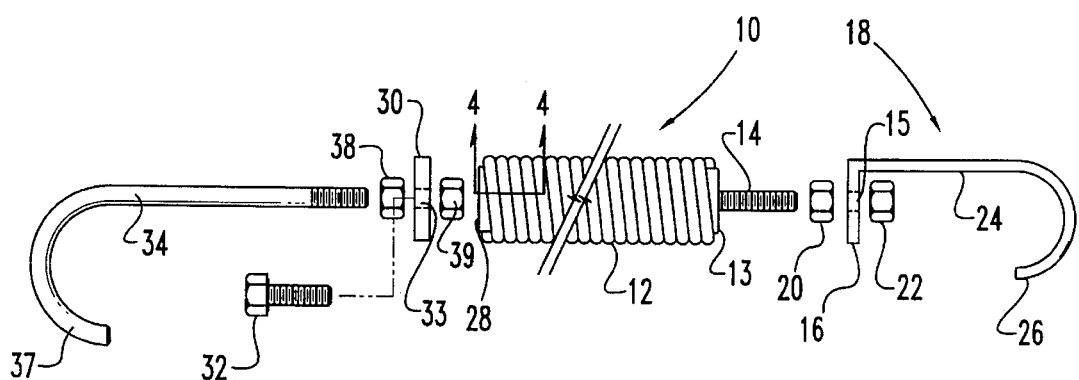
FIG. 2 shows an exploded view of the coil spring assembly of FIG. 1.

FIGS. 1 and 2 show an adjustable coil spring assembly 10 for a leaf spring having a tension coil spring 12 which is round cylindrical in shape. At one end of the spring 12, a connector rod 14 is anchored to the spring 12 by a first anchoring insert 13 screwed into the spring 12. The rod 14 is threaded along its entire length and passes through a hole defined in a flange 16 of a bracket 18. The rod 14 is secured in the hole by locking nuts 20 and 22 which are threaded onto the rod 14 on opposite sides of the flange 16.

The bracket 18 includes a strip 24 extending at right angles from the flange 16 and terminating in a hook 26.

At the other end of the spring 12, a second insert 28 is screwed into the spring 12. A rectangular plate 30 is secured to the insert 28 by a connection bolt 32, which passes through a hole 33 formed in the center of the plate 30 and is screwed into the insert 28. Two end holes (not visible), sized to accommodate the arms 34 and 36, are formed at opposing ends of the plate 30. The arms 34 and 36 are formed from cylindrical rods which are threaded at one end, and bent at the other end to form hooks 37. The threaded ends of the arms 34 and 36 are inserted through the end holes, and the arms 34 and 36 are secured in this position by locking nuts 38 and 39 which are located on the arms 34 and 36 on opposite sides of the plate 30.

Figure 3:
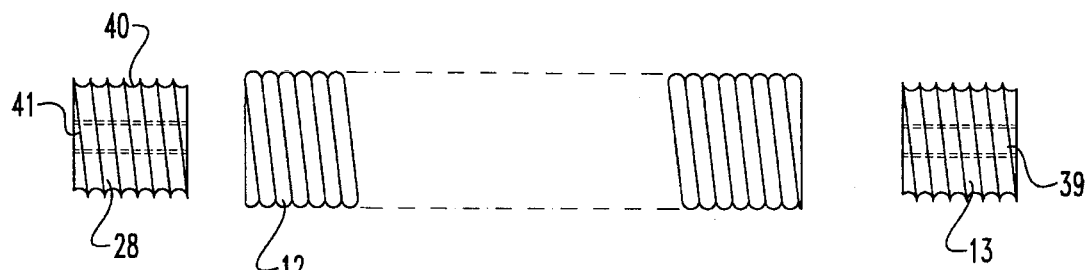
FIG. 3 shows an exploded view of the spring and inserts of FIG. 2.
Figure 4:
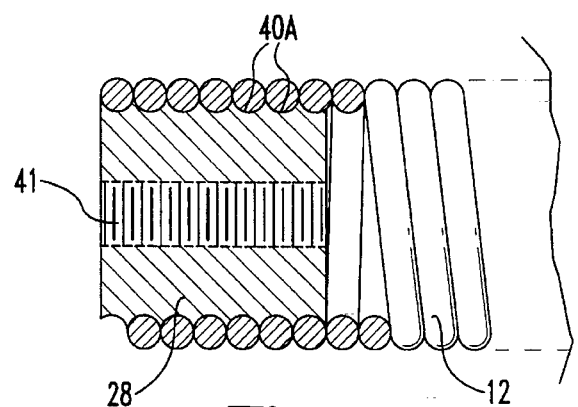
FIG. 4 shows a cross sectional view on the line 4—4 of FIG. 2, showing the inserts accommodated within the spring.

Turning now to FIGS. 3 and 4, the inserts 13 and 28 have a helical groove forming a threaded outer surface 40 which allows the inserts 13 and 28 to be screwed into the complemental scalloped inner surface 40A defined by the coils of the elongate spring 12. The inserts 13 and 28 are formed with threaded axial bores 39 and 41 sized to receive the respective threaded ends of the connector bolt 32 and the connector rod 14.

Figure 5:
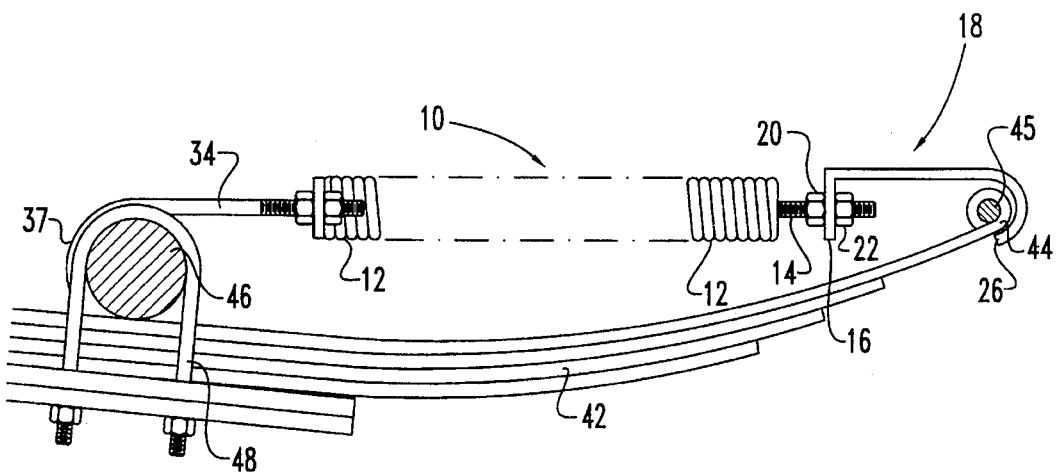
FIG. 5 shows the adjustable coil spring assembly of FIGS. 1 and 2 installed on the leaf spring of a vehicle.

The adjustable coil spring assembly 10 is mounted in place on the leaf spring 42 of a motor vehicle as is shown in FIG. 5. The hook 26 engages an eye 44 of the leaf spring 42. The eye 44 carries a pin 45 which pivotably connects the leaf spring 42 to the chassis of the motor vehicle. At the other end of the coil spring assembly 10, the arms 34 and 36 are secured to the axle 46 of the vehicle by the hooks 37. The leaf spring 42 is secured to the axle 46 by a pair of U-bolts (only one of which is shown at 48) and a plate arrangement. The U-bolts are mounted on either side of the leaf spring 42, and the hooks 37 engage the axle 46 on that portion of the axle 46 between the U-bolts.

Installation of the adjustable coil spring assembly 10 involves jacking up the vehicle to which the assembly is to be installed, so that the leaf spring 42 is unloaded, and extending the assembly 10 in one or more of the following three ways.

Firstly, it will be understood that the overall length of the assembly 10 can be adjusted by loosening the nuts 20 and 22 that secure the connector rod 14 to the flange 16 of the bracket 18, whereafter the bracket 18 can be moved axially along the connector rod 14 towards or away from the spring 12.

Secondly, it is possible to screw the connector rod 14 through the insert 13 to vary the extent to which the rod 14 protrudes from the insert 13 within the spring 12. The effective length of the rod 14, and the overall length of the assembly 10, is varied in this manner.

Thirdly, the insert 13 itself can be rotated within the passage defined by the spring 12, and thus axially moved within the passage. When in place within the spring 12, the insert 13 engages a number of the coils of the spring 12, and prevents these coils from elongating as the spring 12 is placed under tension. The coils of the spring 12 extending from behind the insert 13 towards the bracket 18 are naturally ineffective when the spring 12 is tensioned. Therefore, by screwing the insert 13 into the passage defined by the spring 12, and then rotating the insert 13 until it assumes a specified position within this passage, it is possible to adjust the overall length of the assembly 10, and also to adjust the tension in the spring by altering the number of coils of the spring 12 that will be placed under tension.

Once the assembly 10 has been extended by the required length which is determined by the sparing between the axle 46 and the eye 44 of the leaf spring 42, the hook 26 is connected to the eye 42, and the hooks 37 to the axle 46. The nuts 20 and 22 can then be rotated on the connector rod 14 until the spring 12 is placed under the required tension. The positions of the nuts 20 and 22 can then be adjusted from time to time to adjust the tension of the spring 12 if necessary.

The fact that both the overall length and tension of the assembly 10 can be adjusted in three ways allows the assembly 10 to have a greater versatility than was previously possible. A standard assembly 10 is therefore able w be fined to a far more diverse range of motor vehicles than previous dedicated assemblies, and this obviates the need to manufacture a range of coil spring assemblies to fit different motor vehicles.

Figure 6:
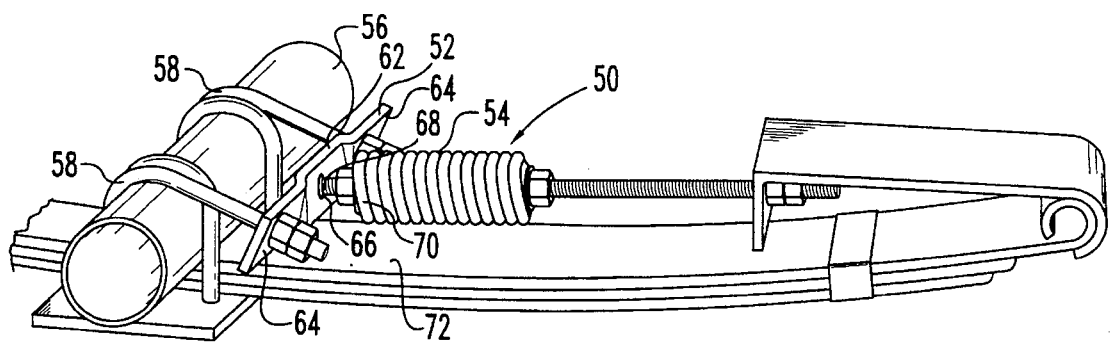
FIG. 6 shows a perspective view of a coil spring assembly according to a second embodiment of the invention fitted to a motor vehicle.
Figure 7:
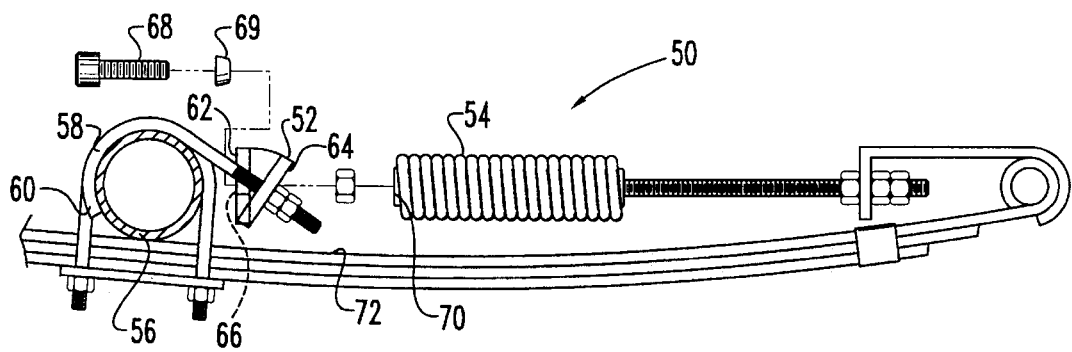
FIG. 7 shows a side view of the assembly shown in FIG. 6.
Figure 8:
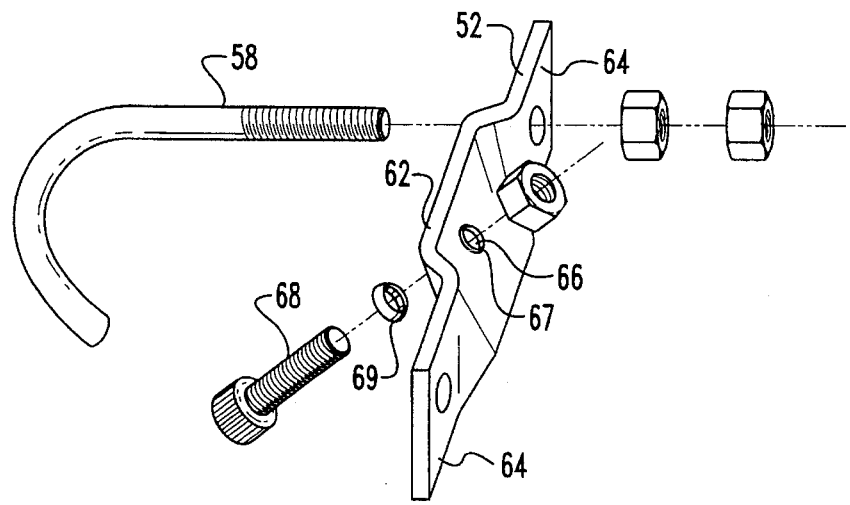
FIG. 8 shows an exploded view of the mounting bracket for the assembly shown in FIG. 6.

Turning now to FIGS. 6 to 8 of the drawings, another embodiment of the invention is shown. What is different in this embodiment is the configuration of a bracket 52 by means of which the coil spring 54 is connected to the axle 56. This arrangement is similar to that previously described wherein the assembly 50 has arms 58 with hooked ends 60 thereon which pass around the axle 56. The bracket 52, however, is not a flat planar member as previously described. The bracket 52 has a central region 62 and a pair of outer regions 64. The central region 62 has a hole 66 passing therethrough and a bolt 68 passes through that hole and into an anchoring insert (not shown) which is screwed into the coil spring 54. The hole 66 is of a larger diameter than the bolt 68 in order that the bolt is able to move angularly relative to the bracket 52. This will be described in more detail herebelow.

The central region 62 of the bracket 52 is angularly offset from the outer regions 64. The angle of inclination is between 5° and 20° and the effect that in the assembled condition the adjustable coil spring assembly adopts a cranked configuration as shown clearly in FIG. 7 of the drawings. The angle between the central region 62 and the outer regions 64 may alter for different vehicle suspension configurations. The angle between the central region 62 and outer region 64 is selected so that the end 70 of the coil spring is located nearer to the upper side of the leaf spring 72 than would be the case if the bracket 52 was made from flat plate. The arrangement is such that the axis of the coil spring is perpendicular to and intersects with the axis 55 of the axle 56 and will remain substantially in this orientation as the axle moves up and down in use.

The hole 66 in the central region 62 is preferably machined to the form of a concave recess or has a concave shaped bush 67 fitted thereto which will allow the bolt 68 to move in an articulated manner during movement up and down of the axle of the vehicle. To assist in this movement the bolt 68 has a convex shaped cup washer 69 fitted thereto which will locate in the convex shaped hole in such a manner that the bolt 68 will be able to move in an articulated manner as previously described. This will ensure that at all times the coil spring is caused to extend and retract in a straight line and no lateral bending of the coil spring will take place due to a bending moment being placed on the coil spring.

Figure 9:
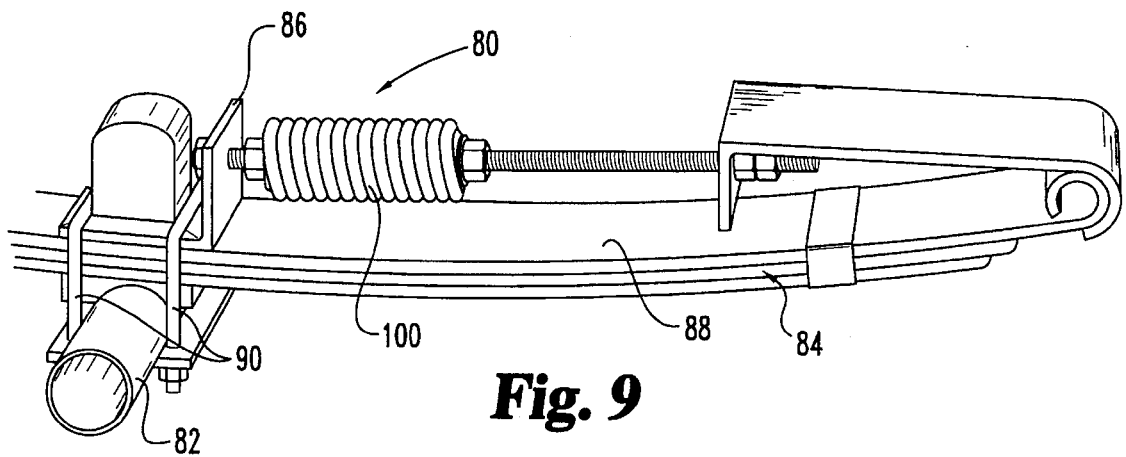
FIG. 9 shows a perspective view of a third embodiment of the invention.
Figure 10:
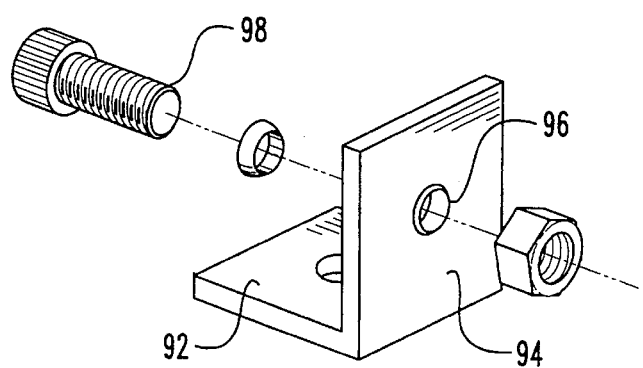
FIG. 10 shows a perspective view of the mounting bracket for the assembly shown in FIG. 9.

Turning now to FIGS. 9 and 10 of the drawings, an arrangement of adjustable coil spring assembly is shown suitable for use on vehicles wherein the axle 82 is located below the coil spring assembly 84. In this arrangement a bracket 86 which is shown more clearly in FIG. 10 of the drawings is clamped between the upper side 88 of the coil spring assembly 44 and the U-bolts 90 which in use hold the axle 82 to the leaf spring assembly 84. The bracket 86 comprises a foot portion 92 which is clamped by the U-bolts 90 and an upstanding arm 94 which is generally perpendicular to the foot portion 92. A hole 96 passes through the upstanding portion 94 and a bolt 98 passes through that hole 96 (in a similar manner to that previously described) in order to connect the coil spring 100. The bolt 98 is also able to move relative to the arm 94 in an articulated manner.

Various alterations and additions may be made to the embodiments described herein without departing from the scope of the invention. In particular, the brackets 52 and 86 may adopt different forms from that described herein, particularly if different connection arrangements are adopted for different vehicle or axle configurations.

I claim:

1. A vehicle supplementary spring assembly adapted to supplement the spring force provided by a leaf spring of a vehicle, said leaf spring acting between the chassis of the vehicle and an axle of the vehicle, and extending transversely relative to the axle, and said supplementary spring assembly comprising:

an elongate coil spring which forms an axially extending passage having a wall of helical configuration defined by the inner surface of the coils of the coil spring;

a first anchoring insert having an outer surface with a complemental helical formation thereon dimensioned to be in threaded engagement with the helical wall of the passage and adapted to be screwed into one end of the coil spring;

a second anchoring insert having an outer surface with a complemental helical formation thereon dimensioned to be in threaded engagement with the helical wall of the passage and adapted to be screwed into an opposite end of the coil spring;

a first connector member connected to the first anchoring insert and adapted to connect the supplementary spring assembly to a first reaction point on the vehicle; and a second connector member connected to the second anchoring insert and adapted to connect the supplementary spring assembly to a second reaction point on the vehicle;

adjustment means for adjusting the overall length of the supplementary spring assembly and so as to allow for variations in spacing between the first and second reaction points when fitted to different vehicles;

said supplementary spring assembly being adapted to apply a tensile force between said first and second reaction points, so as to supplement the action of the leaf spring in supporting the vehicle under conditions of increased loading, said tensile force being selectively variable by varying the position of at least one of the anchoring inserts along the length of the passage, said second connector member being adapted to connect the spring assembly to the axle of the vehicle and being configured to align the coil spring so that its longitudinal axis is perpendicular to and passing through the axle, regardless of the degree of flexure of the leaf spring.

2. A spring assembly according to claim 1 wherein the first anchoring insert is provided with a threaded axial bore, and the first connector member is provided with a threaded shank adapted to screw into said axial bore, the first connector member being adapted to be screwed into or out of the axial bore so as to provide means for further adjustment in the overall length of the supplementary spring assembly.

3. A spring assembly according to claim 1 wherein the second anchoring insert has a threaded axial bore and the second connector member includes a threaded shank adapted to screw into the threaded bore of the second anchoring insert to provide means for adjusting the overall length of the supplementary spring assembly.

4. A spring assembly according to claim 1 wherein the first connector member includes a hook for engaging an eye at one end of the leaf spring, and the second connector member includes a hook adapted to secure to the axle which is supported by said leaf spring.

5. A spring assembly according to claim 1 wherein said second connector is adapted to connect the spring assembly to an axle of a vehicle and said second connector is configured to align the coil spring so that its longitudinal axis intersects with the axis of the axle.

6. A spring assembly according to claim 1 wherein the second connector member comprises a bracket of elongate form adapted to be aligned generally transverse to the axis of the coil spring, said bracket having a central region which in use will be perpendicular to the axis of the coil spring, and two outer regions on opposite sides of the central region which are co-planar with each other and angled relative to the central region.

7. A spring assembly according to claim 6 wherein the coil spring is connected to the central region of the bracket by a bolt which passes through a hole formed in said central region, and screws into the second anchoring insert located within the passage of the coil spring, wherein the bolt is connected to the bracket in an articulated connection such that an angular relationship existing between the bracket and the coil spring may vary as the axle moves up and down in use.

8. A spring assembly according to claim 7 wherein an angle of inclination between the central region and outer regions of the bracket is selected such that, in the assembled condition, the spring assembly adopts a cranked configuration with an end of the coil spring adjacent to the axle being inclined towards the leaf spring as a consequence of said angle of inclination between the central region and outer regions of the bracket.

9. A spring assembly according to claim 8 wherein the bracket comprises a forged plate with a concave recess formed around said hole passing through the central region, said bolt having a cup bearing fitted thereto which locates within the concave recess and allows for said articulated connection between the bolt and the bracket.

10. A spring assembly according to claim 1 in which the longitudinal axis of the coil spring intersects with a central longitudinal axis of the axle, regardless of the degree of flexure of the leaf spring.

* * * * *